Patented Aug. 8, 1950

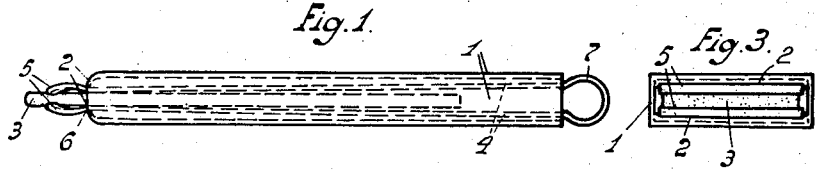
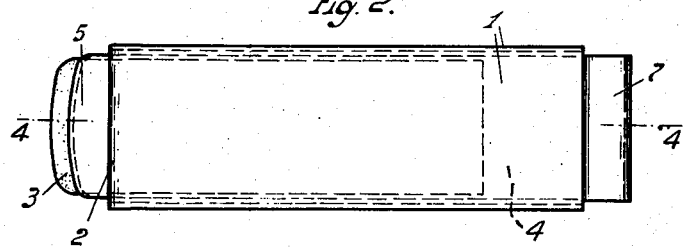
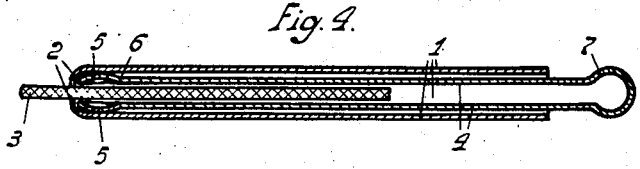

2,517,859

UNITED STATES PATENT OFFICE 2,517,859

ERASING APPLIANCE

Max Fehr, Zurich, Switzerland, assignor to Heinrich Welti, Zurich, Switzerland

Application December 6, 1946, Serial No. 714,424
In Switzerland July 11, 1946

1 Claim. (Cl. 120—36)

The present invention refers to a holder for rubber erasers having a springing clamp arranged displaceably within a flat casing open at both ends and holding a flat strip of erasing rubber between its arms.

Holders of this kind are known in which points directed inwardly are provided on the two arms of the clamp, these points penetrating into the erasing rubber and holding it fixed, the clamp being pushed into the flat casing and thus secured in its position holding the erasing rubber by means of the points.

According to the present invention the two walls bounding the two flat sides of the casing have, at one end of the casing, parts directed towards each other and narrowing the cross-section of the casing, and the two arms of the clamp are provided near their free ends with an indent for receiving the parts narrowing the cross-section of the casing.

One embodiment of the object of the invention is illustrated by way of example in the accompanying drawing in which:

Figure 1 is a side elevational view of the improved device,

Figure 2 is a top plan view thereof,

Figure 3 is an end view of the device, and

Figure 4 is a longitudinal sectional view taken on line 4—4 of Figure 2.

The holder as shown in the drawing consists of a flat hollow casing 1 of rectangular cross-section, open at both ends, and preferably made of metal.

The two walls bounding the flat sides of the casing 1 are at one of its ends provided with parts 2 forming abutments, directed towards each other and narrowing the cross-sectional area of the casing.

The flat strip of erasing rubber 3 lies between the arms 4 of a spring clamp. The free ends of the two arms 4 are provided with parts 5, arc-shaped in longitudinal section and with detents or shoulders 6 formed at the bases of or the points of juncture of the arc-shaped parts 5 with the arms 4.

The part 7 connecting the arms 4 together is circular in cross-section, with a diameter greater than the distance apart of the two arms 4 within the casing 1.

When the clamp, with the erasing rubber 3 lying between its arms 4 and the free end of the rubber projecting beyond the arms, is pushed into the casing 1, a pressure is caused on the clamp arms 4 in consequence of the narrowing of the casing cross-section by the abutment parts 2 of the casing walls. This pressure is transmitted to the erasing rubber 3 lying between the clamp arms 4, so that the rubber is held firmly.

For securing the clamp arms 4 in their clamping position, the clasp is brought in the casing into the position shown in Figs. 1 and 2, where the indents or shoulders 6 lie outside the parts 2, and the part 7 of the clamp lies on the other open end of the casing.

For adjusting the erasing rubber 3 in the clamp, the clamp is drawn back into the casing 1 as shown in Fig. 4, so that the parts 5 of the arms 4 come to lie within the casing 1, the clamp can open and the erasing rubber 3 is free.

What I claim is:

A holder for a flat strip-like rubber eraser including a flat, hollow oblong casing rectangular in cross section and open at both ends, the two walls bounding the flat side being directed toward each other at one end of the casing to provide abutments, a spring clamp adjustable for receiving the eraser and slidably mounted in the casing and formed from a single piece of band metal including an intermediate substantially circular handle portion positioned exteriorly of the casing and parallel clamping arms extending from the circular portion and spaced from each other a distance slightly less than the diameter of the circular portion and normally arranged within the casing, and longitudinally extending, arc shaped clamping portions at the free ends of the arms and forming detents at their points of juncture with the arms for receiving the abutments of the casing, the length of the arms being such that when the detents are engaged by the abutments and the clamping of portions extended from the casing the circular portion is in contact with the other end of the casing and the strip-like eraser being free when the clamping portions are drawn into the casing and in a released position.

MAX FEHR.

REFERENCES CITED

The following references are of record in the file of this patent:

UNITED STATES PATENTS

| Number | Name | Date |
|---|---|---|
| 376,196 | Hoffman | Jan. 10, 1888 |
| 461,205 | Faber | Oct. 13, 1891 |
| 1,884,841 | Pestel | Oct. 25, 1932 |

FOREIGN PATENTS

| Number | Country | Date |
|---|---|---|
| 702,484 | France | Jan. 26, 1931 |